H. D. COWLES.
Manufacture of Horseshoe Nails.

No. 137,762. Patented April 15, 1873.

Witnesses
Henry A. Mitchell
Miles L. Peck

Inventor.
Harley D. Cowles.
By James Shepard. Atty.

UNITED STATES PATENT OFFICE.

HARLEY D. COWLES, OF MONTREAL, CANADA, ASSIGNOR TO HIMSELF AND JAMES TERRY, OF TERRYVILLE, CONNECTICUT.

IMPROVEMENT IN THE MANUFACTURE OF HORSESHOE-NAILS.

Specification forming part of Letters Patent No. 137,762, dated April 15, 1873; application filed January 22, 1873.

*To all whom it may concern:*

Be it known that I, HARLEY D. COWLES, of the city of Montreal, district of Montreal, province of Quebec, and the Dominion of Canada, have invented a new and useful Improvement in the art of Making Horseshoe-Nails, of which the following is a specification:

My invention consists of a process for manufacturing horseshoe-nails—viz., cutting the plate into strips of double nail-blanks, then staving up the heads thereon, and afterward dividing said double blank by cutting, as hereinafter described.

Figure 1:
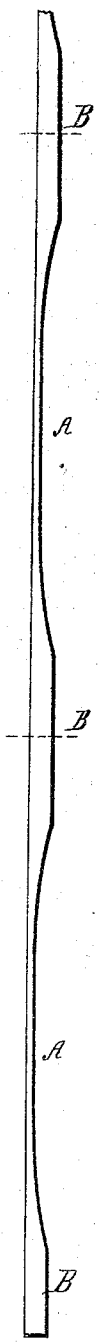
Figure 2:
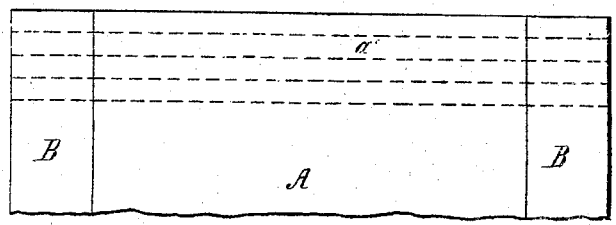
Figure 3:
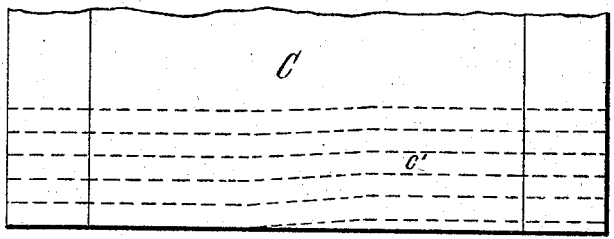
Figure 3:
Figure 4:
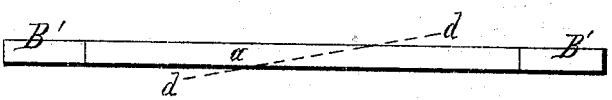
Figure 4:
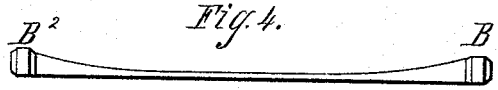
Figure 5:
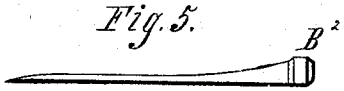

In the accompanying drawing, Figure 1 is an edge view of a portion of a bar of metal, showing the result of the first step in the process of manufacture in accordance with my invention. Fig. 2 is a plan or face view of a portion of said bar, the broken lines therein designating the manner of cutting without waste of stock. Fig. 3 is a face view of the strips as cut from the piece shown in Fig. 2. Fig. 4 is a side elevation of one of said strips with the head-blanks upset or headed; and Fig. 5 is a side elevation of a finished horseshoe-nail.

A designates the reduced portions of the bar shown in Fig. 1, said portions approximating in thickness to the bodies of the nails, being of a length for two nails with their small ends meeting and lapping by each other. B designates the straight portion of said bar, which portions approximate in thickness the width of the body of a finished nail. These bars, Fig. 1, are cut apart at the points designated by transverse broken lines, and one of the pieces C, as cut therefrom, is shown in Fig. 2. By means of suitable shears, dies, or other mechanism, the pieces C are cut up into strips of the width desired for the width of the finished nail-body, and thereby consume the whole stock. I prefer to cut into straight strips $a$, Fig. 3, as indicated by broken lines at $a'$ in Fig. 2. These strips $a$, being of the same width as the body of the nail, the head-blanks $B^1$, which are cut from the straight portion B of the same thickness, are nearly square and of sufficient length to form the head $B^2$ by upsetting the blank. After cutting the pieces C into strips $a$ the heads are formed upon each end, as shown in Fig. 4; after which they are cut apart, as indicated by the broken line $d$, Fig. 3. The point of the nail is then bent so as to bring it central with its body, and the nail-point flattened, when it is finished ready for use. A modification of the strip $a$ is shown at $c$, Fig. 3, and $c'$, Fig. 2, which differs from the strip $a$ only by being crooked at the middle to avoid bending the point after severing the strips. The bending of the nail-point is, therefore, not considered as an essential part of my process.

I claim as my invention—

The improvement in the art of making horseshoe-nails herein described, which consists of cutting the plate into strips of double nail-blanks, then staving up the heads thereon, and afterward dividing said double blank by cutting, substantially as set forth.

HARLEY D. COWLES.

Witnesses:
WM. C. CRUMP,
CHAS. H. OLIPHANT.